Dec. 12, 1944. R. GRAY 2,364,896
ELECTRIC ACCUMULATOR
Filed Dec. 2, 1942
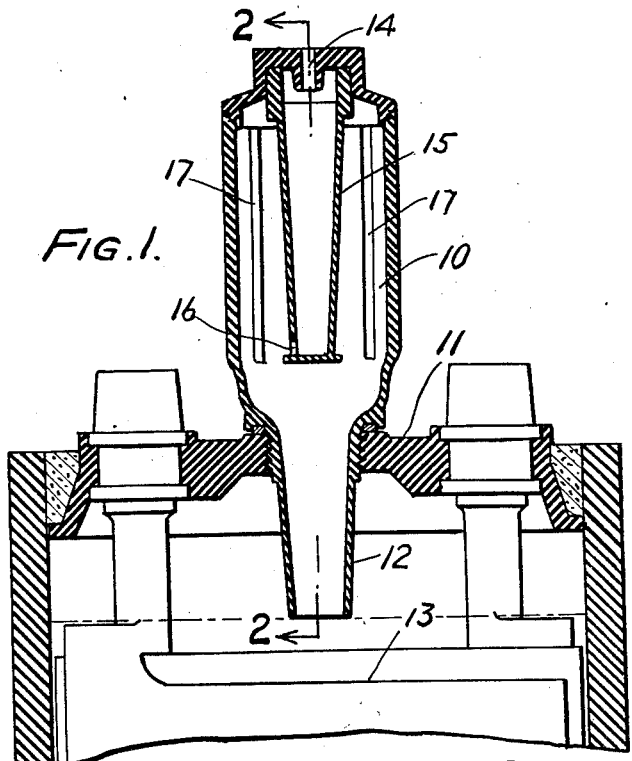
Fig. 1.
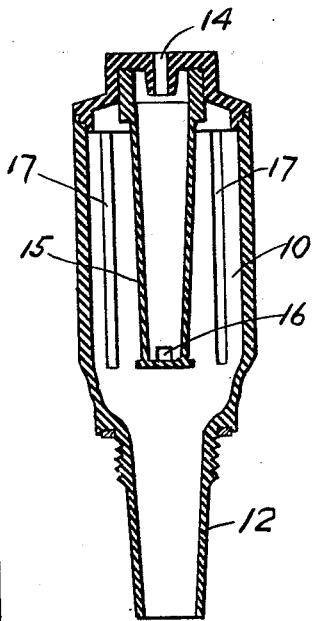
Fig. 2.
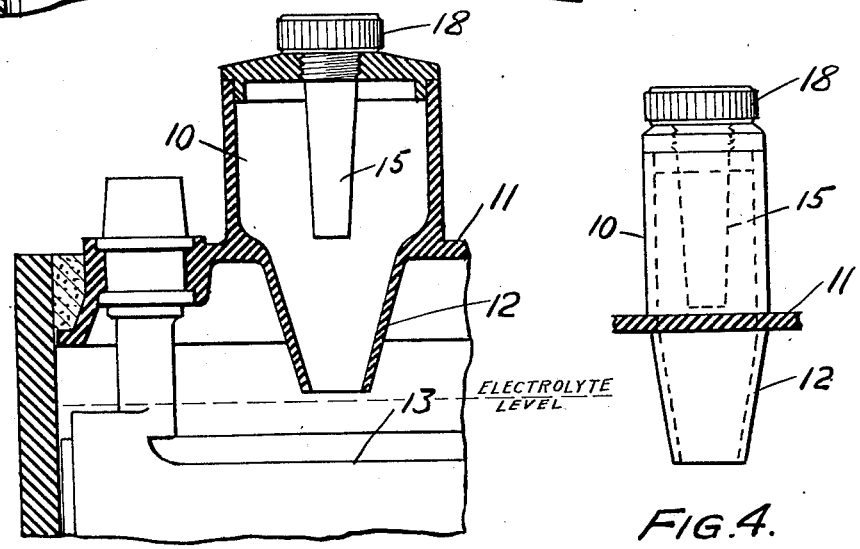
Fig. 3.
Fig. 4.
WITNESS:
INVENTOR
Robin Gray
BY
Augustus B. Stoughton
ATTORNEY Patented Dec. 12, 1944

2,364,896

UNITED STATES PATENT OFFICE 2,364,896

ELECTRIC ACCUMULATOR

Robin Gray, Clifton Junction, near Manchester, England, assignor to The Electric Storage Battery Company, Philadelphia, Pa., a corporation of New Jersey Application December 2, 1942, Serial No. 467,585
In Great Britain August 11, 1941

6 Claims. (Cl. 136—177)

This invention relates to electric accumulators and has for its object to provide improved means for preventing spilling or escape of the electrolyte through the vent aperture should the accumulator be tilted or inverted in service, while permitting the use of cell terminal posts of reduced height as compared with those required for cells of the non-spillable design heretofore employed.

In accordance with this invention, the anti-spill device comprises a chamber wholly or mainly external to and above the cover of the normal cell, and having a depending tubular extension terminating in the cell at a point between the tops of the plates and the top of the cell, and a vent aperture in the top of the said external chamber with a depending tube extending downwards from around the vent to a point well down in the chamber. This depending tube inside the external chamber may be a simple tube or it may contain baffles or itself comprise a system of tubes or chambers such as commonly provided in non-spilling cells as hitherto constructed.

Referring to the accompanying sheet of explanatory drawings:

Figure 1 is a sectional elevation of the upper part of an electric accumulator having an anti-spill venting device constructed and arranged in one convenient form in accordance with this invention.

Figure 2 is a sectional view of the anti-spill venting device on the line 2—2 of Figure 1.

Figure 3 is a view similar to Figure 1 showing a modified construction and arrangement of the anti-spill venting device.

Figure 4 is a view in elevation of the anti-spill venting device of Figure 3 in elevation.

In Figures 1 and 2, the anti-spill venting device comprises a chamber 10 which is as to its major portion external to and above the cover 11 of the accumulator cell and which screws into the cover. The lower part of the chamber is in the form of a tube 12 which extends into the cell and terminates at a point between the tops of the plates 13 and the cover of the cell and thereby forms an unrestricted path between the chamber 10 and the top portion of the cell. The vent aperture 14 in the top of the chamber has a depending tube 15 extending downwards from around it to a point well down in the chamber. There is a lateral opening 16 in the bottom of the tube 15 which communicates with the chamber 10, the bottom of the tube being closed as shown.

The internal surface of the chamber 10 may be ribbed as at 17 for strengthening purposes.

The tube 15 may be of the simple form shown or may contain baffles or a system of tubes or chambers such as commonly provided in non-spill cells as hitherto constructed.

The initial filling of a battery of the type illustrated is limited to the proper level by inspection of the liquid level.

When so filled, the position in the cell of the open bottom of the tube 12 determines the amount of acid which will flow via the said tube into the chamber 10 if the cell is inverted, and the position of the bottom of the tube 15 which extends from around the vent into the chamber determines the amount of acid which can be accommodated in the chamber 10 when inverted without overflow through the vent 14, which should, of course, be not less than the amount of acid which will flow via tube 12 into the chamber 10 when the cell is inverted.

The portion of the top of the chamber 10 in which vent 14 is located is of reduced diameter as shown, so that it can be conveniently gripped (for screwing the chamber quickly into or out of position in the top of the cell), when access to the full diameter of the chamber is restricted due to its size relatively to the width of the cell, when several cells are assembled in close proximity.

In the construction shown in Figures 3 and 4, the chamber 10 is formed integrally with the cover of the cell and the cap 18 (with the vent aperture therethrough) has the tube 15 formed integrally therewith or secured thereto. The cap 18 and tube 15 can be removed to enable liquid to be inserted in the cell.

By providing in the manner described the anti-spill device as a fitting or construction in larger part external to the cover of the normal cell, instead of within the cell above the level of the plates as is usual, the length of the conducting pillars upon the plates is reduced resulting in a reduced weight of cell and reduced electric resistance therein, while at the same time achieving a high degree of unspillability.

While there has been shown particular embodiments of this invention, it will be understood, of course, that it is not desired to be limited thereto since many modifications may be made, and it is, therefore, contemplated in the appended claims to cover any such modifications as fall within the true spirit and scope of this invention.

What I claim is:

1. Means for preventing escape of electrolyte through the vent aperture of an accumulator cell comprising a chamber wholly external to and above the cover of the cell and having a depending imperforate unrestricted tubular extension projecting through the cover and terminating in the cell above the tops of the plates and substantially below the cover of the cell, and a vent aperture in the top of the external chamber with a depending tube extending downwards from around the vent to a point well down in the chamber but above the upper end of said tubular extension said tube provided at its lower end with a single orifice opening into said chamber, said orifice of restricted area compared to that of the bore of said tube, the space provided for trapped liquid in the chamber between the depending tube and the chamber wall being sufficient to hold all the liquid which can escape from the inverted cell via said tubular extension, after said cell has been filled with liquid to the normal level.

2. In a storage battery cell containing electrolyte and provided with a cover and with plate groups having terminal posts passing through the cover, a venting structure comprising walls defining a cavity located above and outside the cover and above and displaced from the terminal posts, said cavity communicating with the interior of the cell through an unrestricted imperforate duct terminating at a point above the normal electrolyte level and below the cover, said cavity provided with a vent tube providing a vent passage extending from a point in the interior of the cavity above the upper end of said duct and displaced from the walls of said cavity to a point exterior to the cavity, the space for trapped liquid in said cavity between said vent tube and the cavity walls being sufficient to hold all of the liquid which can escape from the inverted cell through said duct after the cell has been filled with liquid to the normal level, whereby when the cell is inverted electrolyte is retained in the space in the cavity surrounding the vent tube, and a single orifice provided at the lower end portion of said tube opening into said cavity, said orifice of restricted area compared to that of the bore of said tube.

3. In a storage battery cell containing electrolyte and provided with a cover and with plate groups having terminal posts passing through the cover, means for venting said cell without electrolyte spillage in any position said cell may take including the inverted position, said means comprising an electrolyte-receiving chamber from which said posts are excluded and which is supported on and above the outer surface of said cover, an unrestricted imperforate duct in the bottom of said chamber extending to a point in the cell substantially below the cover and connecting said chamber with the space above the normal electrolyte level in said cell, a vent opening in the top of said chamber, and a vent tube surrounding said vent opening and extending downwardly into said chamber to a point above the opening of said duct into said chamber said tube provided with a single orifice in its lower end portion opening into said chamber, said orifice of restricted area compared to that of the bore of said tube and displaced from the walls of said chamber the space between said vent tube and the walls of said chamber being sufficient to trap all the electrolyte which can escape from the inverted cell via said duct after said cell has been filled to the normal level without covering the inlet to said vent tube, whereby venting of said cell is accomplished over all positions thereof.

4. Means for preventing escape of electrolyte through the vent aperture of an accumulator cell comprising a chamber wholly external to and above and integral with the cover of the cell and having a depending unrestricted imperforate tubular extension terminating in the cell above the tops of the plates and substantially below the cover of the cell, and a vent aperture in the top of the external chamber with a depending tube extending downwards from around the vent to a point above the top surface of the cover said tube provided in its lower end portion with an orifice opening into said chamber, displaced from the walls of said chamber and of restricted area compared to that of the bore of said tube, the space for trapped liquid between said depending tube and the walls of said chamber being sufficient to hold all the liquid which can escape from the inverted cell via said tubular extension after said cell has been filled with liquid to the normal level.

5. Means for preventing escape of electrolyte through the vent aperture of an accumulator cell comprising a chamber wholly external to and above the normal cover of the cell and having a depending unrestricted imperforate tubular extension terminating in the cell above the tops of the plates and substantially below the cover of the cell, and a vent aperture in the top of the external chamber with a depending tube extending downwards from around the vent well down into said chamber to a point above the connection of said tubular extension and said chamber said tube provided in its lower end portion with a single orifice opening into said chamber, said orifice being of restricted area compared to that of the bore of said tube, said chamber detachable from and having screw-thread engagement with the cover and having a top portion of reduced diameter to facilitate insertion and removal.

6. In an invertable continuously venting nonspillable battery the improvement which consists in reducing the space between the top of the plates and the cover and shortening the terminal posts by means comprising a chamber located outside of the normal cover and having at its top a vent, an imperforate tube depending from said chamber and communicating with the interior thereof and having an unrestricted open end arranged in said space substantially below said cover, said tube by its length serving to limit the quantity of electrolyte discharged from the cell into the chamber when the battery is inverted, and a second tube communicating with the vent and terminating in said chamber at a point above the upper end of said first-mentioned tube, said second tube opening into said chamber only through an orifice at its lower end of restricted area compared to that of the bore of said second tube, the space provided for trapped liquid between said second tube and the walls of said chamber being sufficient to hold all of the liquid which can escape from the inverted battery via said first-mentioned tube after said battery has been filled with liquid to the normal level.

ROBIN GRAY.